US 6,698,078 B2
Mar. 2, 2004

(12) United States Patent
Prucher (10) Patent No.: US 6,698,078 B2
(45) Date of Patent: Mar. 2, 2004

(54) METHOD FOR FORMING TWO PIECE AXLE SHAFT (75) Inventor: Bryan Paul Prucher, Clarkston, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 10/338,453

(22) Filed: Jan. 8, 2003

(65) Prior Publication Data

US 2003/0093888 A1 May 22, 2003

Related U.S. Application Data (62) Division of application No. 09/886,686, filed on Jun. 21, 2001, now abandoned.

(51) Int. Cl.$^7$ .......................... B21D 39/03; B23D 13/04
(52) U.S. Cl. ............................ 29/428; 29/557
(58) Field of Search ............... 29/428, 525, 525.14, 29/893, 893.1, 893.2, 893.32–893.37, 557; 301/124.1, 126; 464/179, 182; 475/230

(56) References Cited

U.S. PATENT DOCUMENTS

| 3,024,626 A | 3/1962 | Frischman |
| 3,465,545 A | 9/1969 | Stamm |
| 4,135,766 A * | 1/1979 | Trautloff ............... 301/114 |
| 4,188,800 A | 2/1980 | Fujita et al. |
| 4,301,672 A | 11/1981 | Simon |
| 4,351,407 A | 9/1982 | Call |
| 4,389,134 A | 6/1983 | Colas |
| 4,416,564 A | 11/1983 | Billet et al. |
| 4,435,972 A | 3/1984 | Simon |
| 4,486,052 A | 12/1984 | Taggart, Jr. |
| 4,664,287 A | 5/1987 | Wilson et al. |
| 4,791,269 A | 12/1988 | McLean et al. |
| 4,847,964 A | 7/1989 | Adams et al. |
| 4,886,392 A | 12/1989 | Iio |
| 5,205,464 A | 4/1993 | Simon |
| 5,213,250 A | 5/1993 | Simon |
| 5,309,620 A | 5/1994 | Shinohara et al. |
| 5,448,820 A | 9/1995 | LeBlanc |
| 5,607,358 A | 3/1997 | Stall et al. |
| 5,611,136 A | 3/1997 | LeBlanc |
| 5,620,388 A | 4/1997 | Schlegelmann et al. |
| 5,632,684 A * | 5/1997 | Kumar et al. ............... 464/179 |
| 5,685,933 A | 11/1997 | Ohta et al. |
| 5,722,147 A | 3/1998 | Brazle |
| 6,059,378 A * | 5/2000 | Dougherty et al. ...... 301/124.1 |
| 6,065,813 A | 5/2000 | Fett et al. |
| 6,139,462 A | 10/2000 | Gage et al. |
| 6,189,413 B1 | 2/2001 | Morse et al. |

FOREIGN PATENT DOCUMENTS

| CA | 895627 | 3/1972 |
| FR | 2682067 | 4/1993 |

* cited by examiner

Primary Examiner—John C. Hong
(74) Attorney, Agent, or Firm—Harness, Dickey & Pierce P.L.C.

(57) ABSTRACT

An axle shaft for a differential assembly. The axle shaft includes a shaft structure and a flange structure. The shaft structure has a coupling portion with an engagement surface. The flange structure is formed in a fine blanking operation and has a mounting aperture with a contact surface. The mounting aperture is sized to receive the coupling portion such that the engagement surface and the contact surface are engaged to one another so as to facilitate transmission of rotary power therebetween. The shaft structure and the flange structure are fixedly secured to one another to facilitate the transmission of rotary power therebetween.

42 Claims, 5 Drawing Sheets

METHOD FOR FORMING TWO PIECE AXLE SHAFT

This is a divisional application of U.S. patent application Ser. No. 09/886,686, filed Jun. 21, 2001 entitled "TWO PIECE AXLE SHAFT".

FIELD OF THE INVENTION

The present invention generally relates axle assemblies and more particularly to an axle assembly having a two piece axle shaft.

BACKGROUND OF THE INVENTION

Many motor vehicles employ driveline systems wherein rotary power is distributed by a differential to a pair of axle shafts. Typically, axle shafts include a flange that is configured to be mated to a wheel, and a shaft, which couples the flange to the differential. The axle shafts known in the art are typically formed, at least partially, by a combination of forging and machining wherein a single steel billet is shaped to the general configuration of an axle by hot forging and cold extrusion. The final finished form is then produced by a series of secondary machining operation. Construction of axle shafts in this manner is known to have several drawbacks.

One such drawback concerns the overall cost of the axle shaft. As mentioned above, the axle shaft is initially formed in a forging operation so as to provide the axle shaft with a predetermined grain structure. Forging, however, is a relatively expensive process that is typically incapable of net forming axle shafts and other automotive components. Furthermore, several secondary operations, such as straightening, are often necessary prior to the finish machining of the forged axle shaft. The finish machining of an axle shaft usually entails several turning operations, several drilling operations, a hobbing or broaching operation and in most cases, a follow-up heat treating operation. As a result of the cost of the capital equipment, perishable tooling and labor associated with these operations, it is relatively common for the finish machining costs to be more than twice the cost of the axle shaft forging.

Another drawback concerns the weight of the finished axle shaft. As a forging operation is employed to initially form the axle shaft from a steel billet, the axle shaft is formed with a solid shaft between the ends that will ultimately mate to the vehicle wheel and the vehicle differential. Often times, however, the strength that is provided by the solid shaft far exceeds that which is necessary and as such, the additional mass of the solid shaft is undesirable. Removal of this additional mass, however, is typically not practical due to the costs associated with yet another machining operation and/or the impact on other areas of the axle shaft. Assuming, for example, that a drilling operation could be employed to hollow out the shaft, its costs would likely be prohibitive and there would be some concerns that the hole formed would negatively impact portions of the axle shaft, such as the end portion that couples to the differential.

Accordingly, there remains a need in the art for an improved axle shaft that is more easily manufactured and lighter in weight than conventionally forged axle shafts.

SUMMARY OF THE INVENTION

In one preferred form, the present invention provides an axle shaft for a differential assembly. The axle shaft includes a shaft structure and a flange structure. The shaft structure has a coupling portion with an engagement surface and the flange structure has a mounting aperture with a contact surface. The mounting aperture is sized to receive the coupling portion to permit the engagement surface and the contact surface to be engaged to one another so as to facilitate transmission of rotary power therebetween. In one embodiment, an interference fit, such as a press fit or a shrink fit, is employed to fix the coupling portion to the mounting aperture and a laser weld is employed to ensure that the shaft and flange structures remain fixedly secured to one another. In another embodiment, the laser weld both secures the shaft and flange structures to one another as well as facilitates the transmission of drive torque therebetween.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
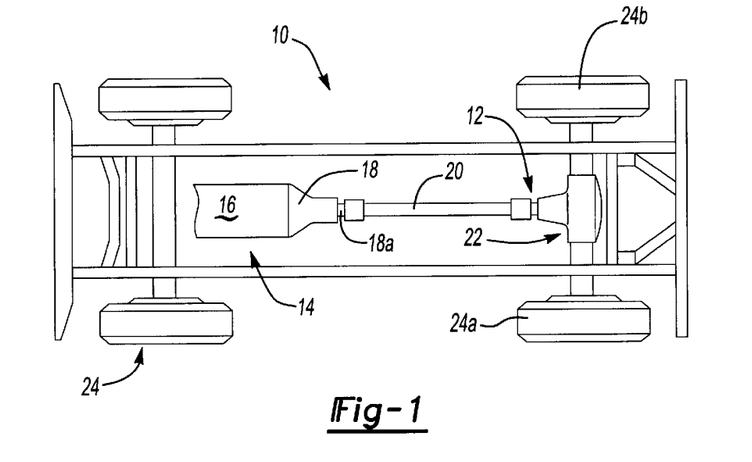
FIG. 1 is a schematic illustration of a motor vehicle constructed in accordance with the teachings of the present invention.

With reference to FIG. 1 of the drawings, a vehicle having a differential assembly that is constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a drive shaft 20, a rear axle 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output and a gear reduction unit. The gear reduction unit is operable for coupling the transmission input to the transmission output at a predetermined gear speed ratio. The drive shaft 20 is coupled for rotation with the output of the transmission 18. Drive torque is transmitted through the drive shaft 20 to the rear axle 22 where it is selectively apportion in a predetermined manner to the left and right rear wheels 24a and 24b, respectively.

Figure 2:
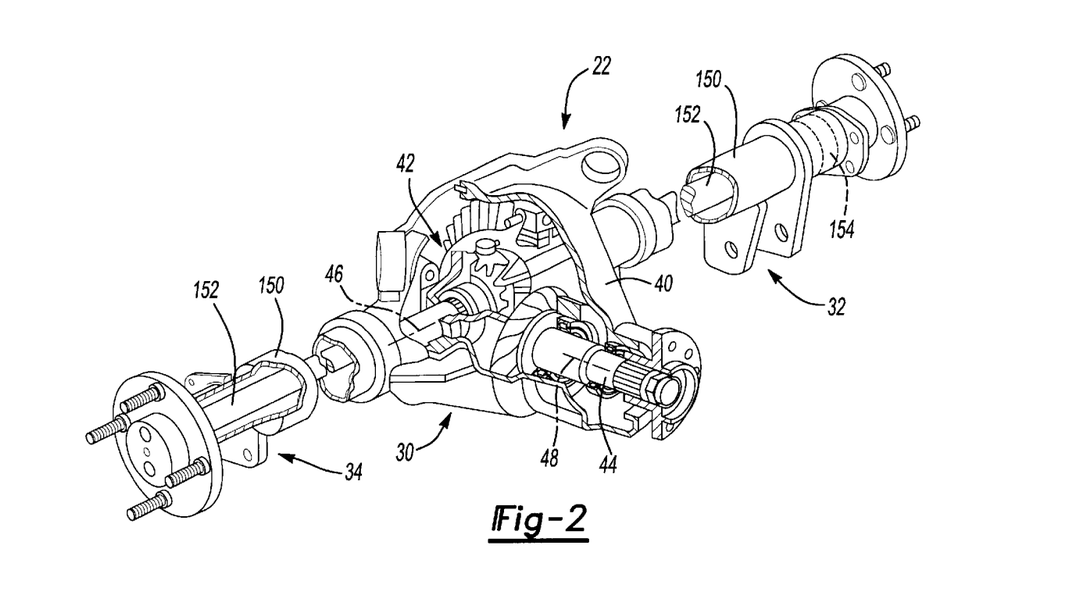
FIG. 2 is a cut-away perspective view of a portion of the motor vehicle of FIG. 1, illustrating the rear axle in greater detail.
Figure 3:
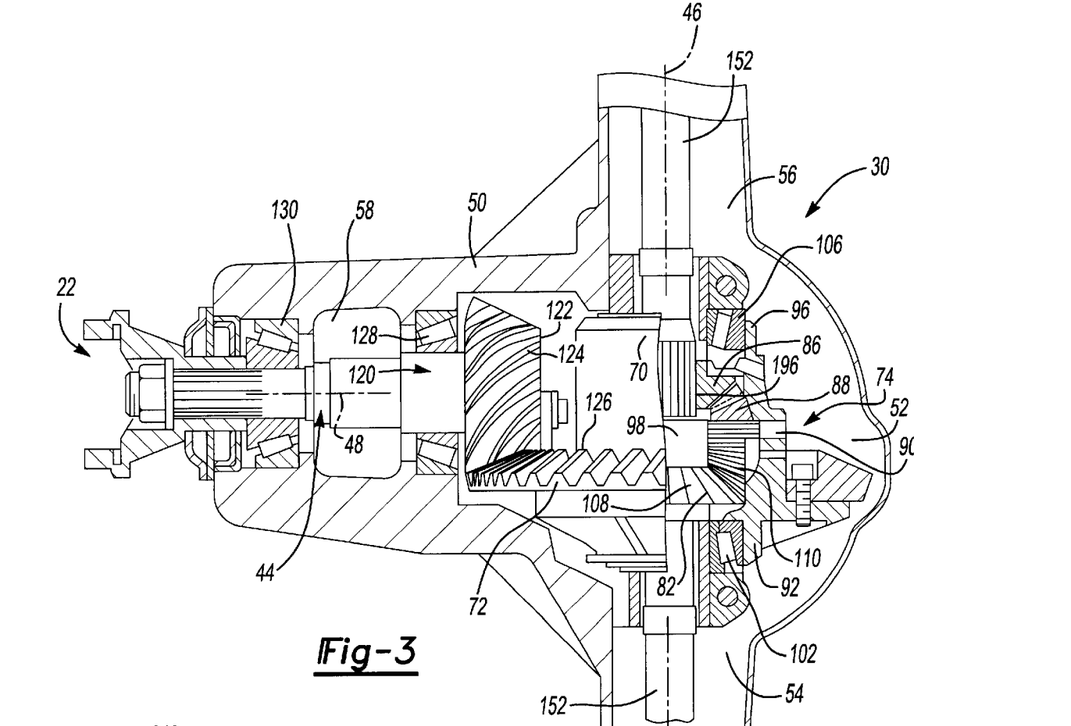
FIG. 3 is a section view of a portion of the rear axle illustrated in FIG. 2.

With additional reference to FIGS. 2 and 3, the rear axle 22 is shown to include a differential assembly 30, a left axle shaft assembly 32 and a right axle shaft assembly 34. The differential assembly 30 includes a housing 40, a differential unit 42 and an input shaft assembly 44. The housing 40 supports the differential unit 42 for rotation about a first axis 46 and further supports the input shaft assembly 44 for rotation about a second axis 48 that is perpendicular to the first axis 46.

The housing 40 is initially formed in a suitable casting process and thereafter machined as required. The housing includes a wall member 50 that defines a central cavity 52 having a left axle aperture 54, a right axle aperture 56, and an input shaft aperture 58.

The differential unit 42 is disposed within the central cavity 52 of the housing 40 and includes a case 70, a ring gear 72 that is fixed for rotation with the case 70, and a gearset 74 that is disposed within the case 70. The gearset 74 includes first and second side gears 82 and 86 and a plurality of differential pinions 88, which are rotatably supported on pinion shafts 90 that are mounted to the case 70. The case 70 includes a pair of trunnions 92 and 96 and a gear cavity 98. A pair of bearing assemblies 102 and 106 are shown to support the trunnions 92 and 96, respectively, for rotation about the first axis 46. The left and right axle assemblies 32 and 34 extend through the left and right axle apertures 54 and 56, respectively, where they are coupled for rotation about the first axis 46 with the first and second side gears 82 and 86, respectively. The case 70 is operable for supporting the plurality of differential pinions 88 for rotation within the gear cavity 98 about one or more axes that are perpendicular to the first axis 46. The first and second side gears 82 and 86 each include a plurality of teeth 108 which meshingly engage teeth 110 that are formed on the differential pinions 88.

The input shaft assembly 44 extends through the input shaft aperture 58 where it is supported in the housing 40 for rotation about the second axis 48. The input shaft assembly 44 includes an input shaft 120, a pinion gear 122 having a plurality of pinion teeth 124 that meshingly engage the teeth 126 that are formed on the ring gear 72, and a pair of bearing assemblies 128 and 130 which cooperate with the housing 40 to rotatably support the input shaft 120. The input shaft assembly 44 is coupled for rotation with the drive shaft 20 and is operable for transmitting drive torque to the differential unit 42. More specifically, drive torque received the input shaft 120 is transmitted by the pinion teeth 124 to the teeth 126 of the ring gear 72 such that drive torque is distributed through the differential pinions 88 to the first and second side gears 82 and 86.

As the left and right axle shaft assemblies 32 and 34 are identical in their construction and operation, only the left axle shaft assembly 32 will be described in detail. Similar or corresponding elements of the right axle shaft assembly 34 are identified by the same reference numerals as are used to describe the left axle shaft assembly 32. The left axle shaft assembly 32 includes an axle tube 150 that is fixed to the left axle aperture 54 and an axle shaft 152 that is supported by a bearing 154 for rotation in the axle tube 150 about the first axis 46. As those skilled in the art will appreciate, the left axle shaft assembly 32 is illustrated to be of a semi-floating design wherein the axle shaft 152 supports a portion of the weight of the vehicle 10.

Figure 4:
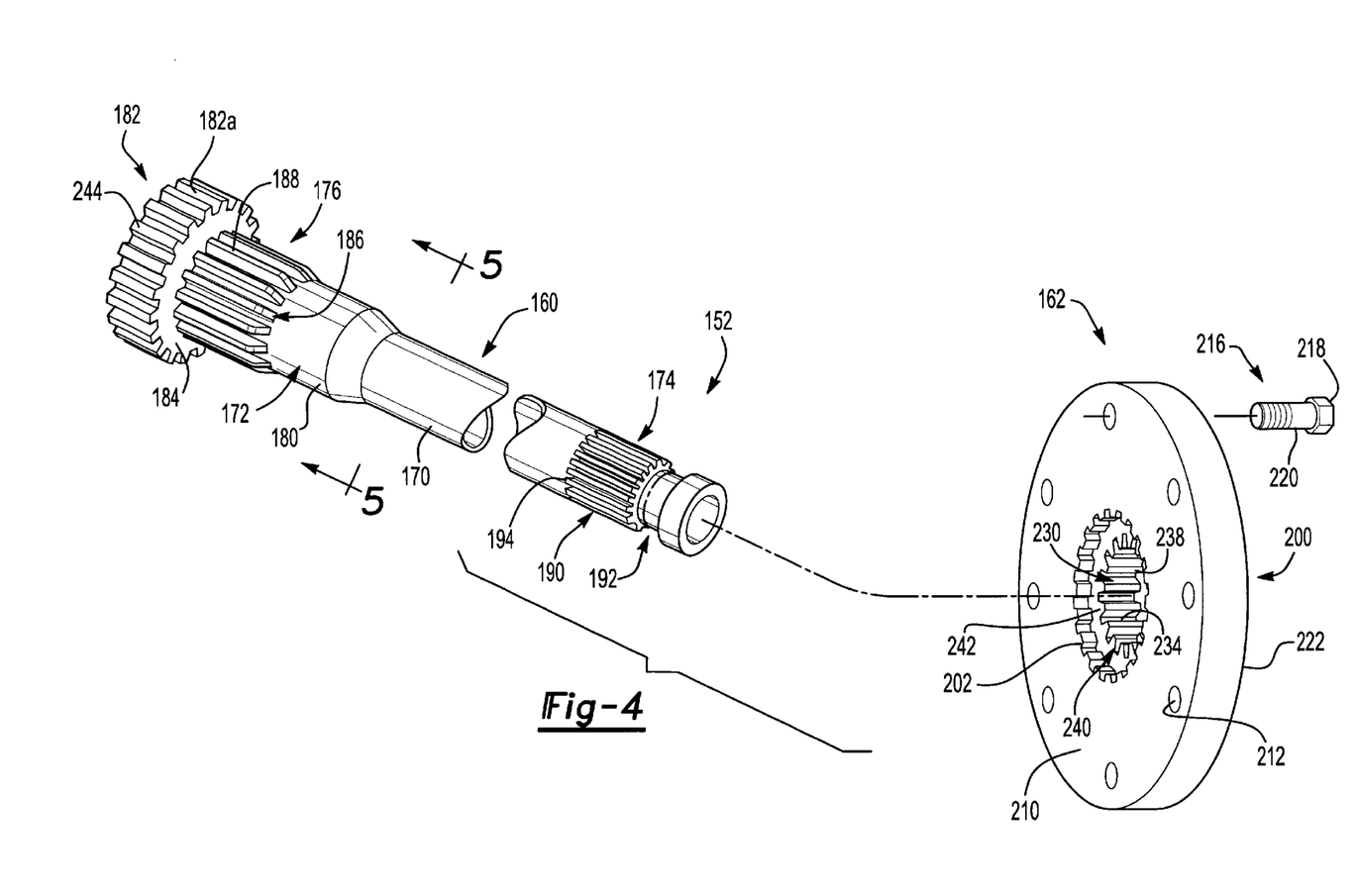
FIG. 4 is an exploded perspective view of a portion of the rear axle, illustrating the axle shaft in greater detail.
Figure 5:
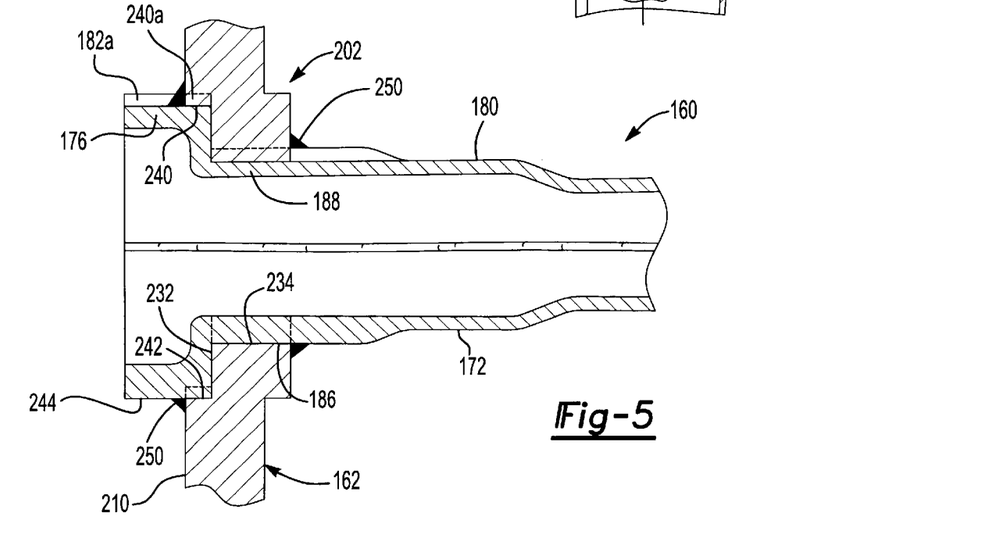
FIG. 5 is a partially broken-out side view of the axle shaft.

With additional reference to FIGS. 4 and 5, the axle shaft 152 is shown to include a shaft structure 160 and a flange structure 162. The shaft structure 160 and the flange structure 162 may be formed from identical materials, or in the alternative, the shaft structure 160 may be formed from a first material and the flange structure formed from a second material that is different than the first material. The shaft structure 160 is shown to include a body portion 170, a bearing support portion 172, an input portion 174, and a coupling portion 176. The body portion 170 is generally uniform in its cross-section and is coupled at opposite ends to the bearing support portion 172 and the input portion 174. The bearing support portion 172 includes a bearing surface 180 that is sized to engage in a press-fit manner the inner bearing race of the bearing 154 and in the particular embodiment illustrated, has an outer diameter that is generally larger than that of the body portion 170. The coupling portion 176 is fixedly coupled to the opposite end of the bearing support portion 172 and is configured to couple the shaft structure 160 to the flange structure 162. The coupling portion 176 includes a head portion 182 having an abutting flange 184, and an engagement surface 186. In the example provided, the head portion is includes a plurality of lobed teeth, but may alternatively be formed with any other geometric shape. The head portion 182 terminates at the abutting flange 184. The abutting flange 184 extends circumferentially around the coupling portion 176 and radially outwardly of the engagement surface 186. The engagement surface 186 may have a circular shape but is preferably non-circular in shape with an outer diameter or dimension that is generally larger than the diameter of the bearing surface 180. In the particular embodiment illustrated, the engagement surface 186 includes a plurality of circumferentially spaced spine teeth 188 which will be discussed in greater detail, below. Those skilled in the art will understand from the description below, however, that any appropriate geometric shape may be substituted for the spline teeth 188, including lobes, or even smooth, particularly in the case of a shrink fit or welded construction.

The input portion 174 is shown to include an input spline 190 and a lock slot 192 and in the particular embodiment illustrated, is necked down somewhat from the body portion 170. The input spline 190 includes a plurality of spline teeth 194 that are configured to meshingly engage a plurality of spline teeth 196 that are formed in the first side gear 82. Meshing engagement of the spline teeth 194 and 196 facilitates the transmission of rotary power from the differential unit 42 to the shaft structure 160. The lock slot 192 is an annular groove that is formed into the perimeter of the input portion 174. The input spline 190 and an annular wall member abut the opposite sides of the lock slot 192. The lock slot 192 is sized to receive a conventional C-lock clip (not shown) which is employed to couple the input portion 174 to the first side gear 82 in a manner that is well known to those skilled in the art.

In the particular embodiment illustrated, the shaft structure 160 is formed from a hollow, tubular blank which substantially reduces the overall weight of the axle shaft 152 as compared with a conventionally constructed solid axle shaft. In a presently preferred embodiment, a welded seam tubular material having an elongated grain structure is employed to form the tubular blank. The tubular blank is initially rotary swaged and/or orbitally forged over a mandrel (not shown) to pre-form the coupling portion 176, the input portion 174 and the bearing surface 180, as well as to close off the hollow central cavity in an area proximate the input portion 174 to inhibit fluids from flowing through the axle shaft 152. Additional operations, such as roll forming, turning and/or grinding, are employed to net form or near-net form portions of the shaft structure 160. For example, features such as the input spline 190, the spline teeth 188 of the engagement surface 186, the lobes 182a of the head portion 182, and the abutting flange 184 are net-formed in a roll forming operation. The lock slot 192 is near-net formed in a roll forming operation and thereafter finished machined in a turning operation. The bearing surface 180 is near-net formed in a roll forming operation and is finished in an appropriate machining operation, such as grinding, after the input spline 190, the spline teeth 188 and the bearing surface 180 have been appropriately heat treated, as by induction hardening.

The flange structure 162 is a one-piece annular plate, having a wheel mounting portion 200 and a center hub 202. The wheel mounting portion 200 includes a generally flat abutting face 210, which is configured to abut an associated one of the wheels 24, and a plurality of cylindrically shaped, circumferentially spaced wheel stud mounting apertures 212 that extend through the wheel mounting portion 200 on an axis that is perpendicular to the abutting face 210. Each wheel stud mounting aperture 212 is sized to engage in a press-fit manner a conventional wheel stud 216 having a head 218 and a threaded portion 220. The head 218 of the wheel stud 216 abuts a side 222 of the wheel mounting portion 200 opposite the abutting face 210 and the threaded portion 220, which is configured to threadably engage a conventional lug nut (not shown), extends outwardly from the abutting face 210.

The center hub 202 includes a mounting aperture 230 that is also arranged perpendicular to the abutting face 210. The mounting aperture 230 includes an annular lip 232 and a contact surface 234. The contact surface 234 is configured to engage the engagement surface 186 of the coupling portion 176 in a manner that facilitates the transmission of rotary power therebetween. In the example provided, a plurality of spline apertures 238 are formed into the perimeter of the mounting aperture 230. Additionally, the mounting aperture 230 is sized to receive the coupling portion 176 in a press-fit manner. The annular lip 232 abuts the abutting flange 184 and as such, cooperates with the abutting flange 184 to permit the flange structure 162 to be positioned on the shaft structure 160 at a predetermined location.

Also in the example provided, the center hub 202 is elongated somewhat along the axis of the mounting aperture 230 so as to increase the robustness of the interconnection between the shaft structure 160 and the flange structure 162. In this regard, the center hub 202 includes a secondary mounting aperture 240 having a secondary contact surface 242 that engages the outer surface 244 of the head portion 182 to permit the transmission of rotary power therebetween. Accordingly, the secondary mounting aperture 240 is sized to receive at least a portion of the head portion 182 and as such, includes a plurality of lobes 240a that are configured to meshingly engage the lobes 182a of the head portion 182. As with the connection between the engagement surface 186 and the contact surface 234, an interference fit, such as a press fit or a shrink fit, is preferably employed to secure the secondary contact surface 242 to the outer surface 244 of the head portion 182. As those skilled in the art will understand, a second weld 250 may additionally or alternatively be employed to fixedly couple the head portion 182 to the center hub 202.

Advantageously, the head portion 182 is sized so as not to permit the shaft structure 160 to slide completely through the flange structure 162. Construction in this manner ensures that the flange structure 162 will remain coupled to the shaft structure 160 even in situations where the coupling means (i.e., the interference fit(s) and/or laser weld) that fixes these components together has failed.

The flange structure 162 is preferably entirely formed in a fine blanking operation. In a presently preferred embodiment, the material from which the flange structure 162 is formed is a sheet or flat stock material that has been processed in a rolling operation to elongate the grain structure in a predetermined direction. As those skilled in the art will understand, fine blanking is a controlled shearing process in which a tightly clamped workpiece is forced through a die opening to produce accurate workpieces with a fine finish and relatively straight edges. However, those skilled in the art will understand that alternative and/or additional forming and/or machining operations may also be employed to form the flange structure 162. For example, the flange structure 162 may initially be formed in a stamping operation with an undersized mounting aperture 230 and thereafter processed through a secondary operation, such as a broaching operation, to finish the mounting aperture 230.

With the shaft structure 160 and the flange structure 162 initially formed in the manner described above, they are thereafter assembled such that the coupling portion 176 is engaged to the mounting aperture 230. The flange structure 162 is abutted against the coupling portion 176 such that the annular lip 232 abuts the abutting flange 184. The shaft structure 160 and the flange structure 162 are thereafter laser welded so as to ensure that they remain fixedly coupled to one another. In the example provided, the engagement and contact surfaces 186 and 234 are configured to transmit rotary power between the shaft structure 160 and the flange structure 162. In this regard, it is presently preferred that an interference fit, such as a press fit or a shrink fit, be employed to fixedly couple the shaft structure 160 and the flange structure 162 and that the laser weld 250 not serve as the primary means for transferring rotary power between the shaft structure 160 and the flange structure 162. As such, the laser weld 250 may be sized in a relatively small manner so as to minimize the amount of heat that is delivered to the shaft structure 160 and the flange structure 162 when it is being formed. Those skilled in the art will understand, however, that the coupling of the shaft structure 160 and the flange structure 162 may be accomplished somewhat differently. For example, an interference fit alone may be employed to fixedly couple the shaft and flange structures 160 and 162 and transmit rotary power therebetween. As another example, the laser weld alone may be employed to both fixedly couple the shaft and flange structures 160 and 162 and transmit rotary power therebetween.

Figure 6:
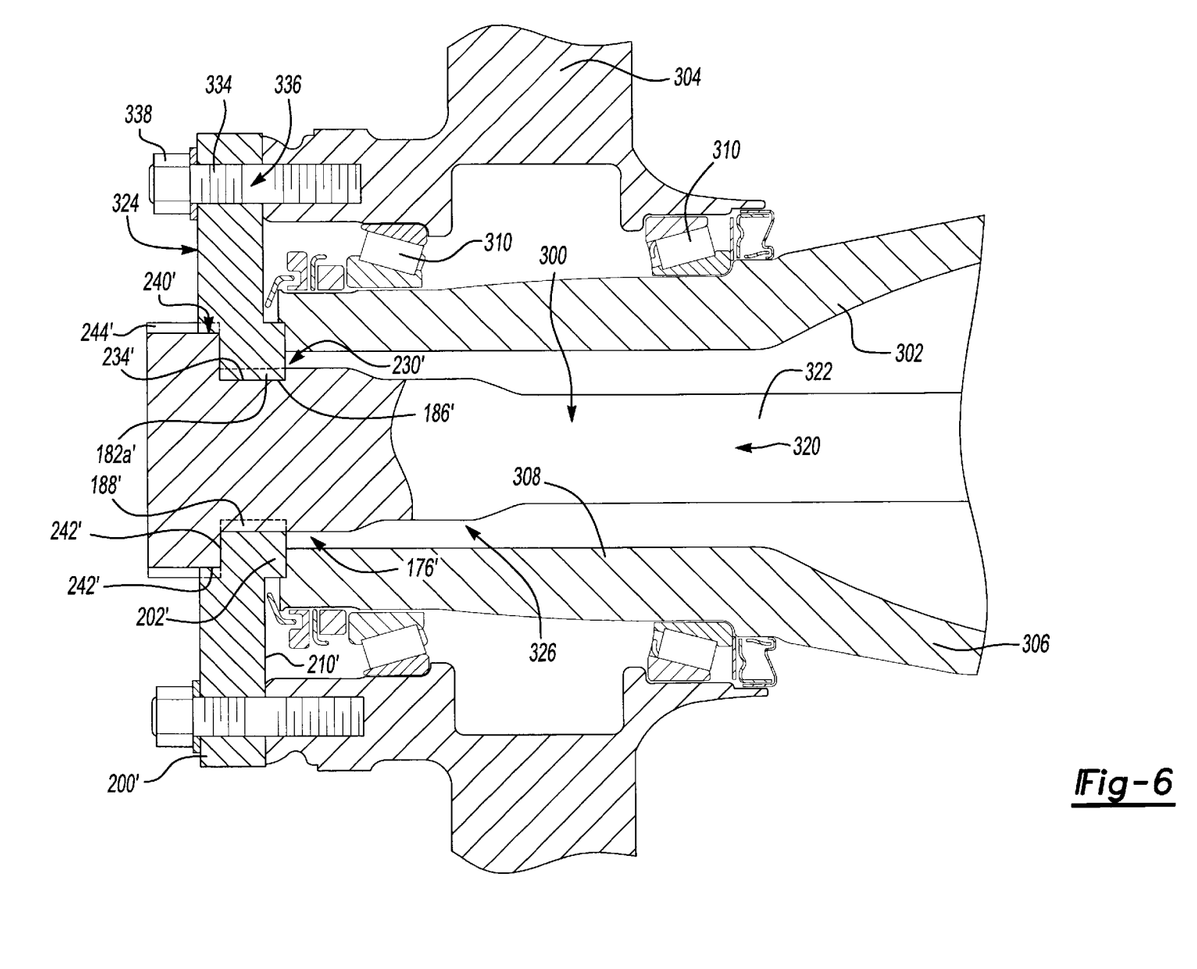
FIG. 6 is an partial section view of a vehicle having an axle shaft assembly constructed in accordance with an alternate embodiment of the present invention.
Figures 7, 7A:
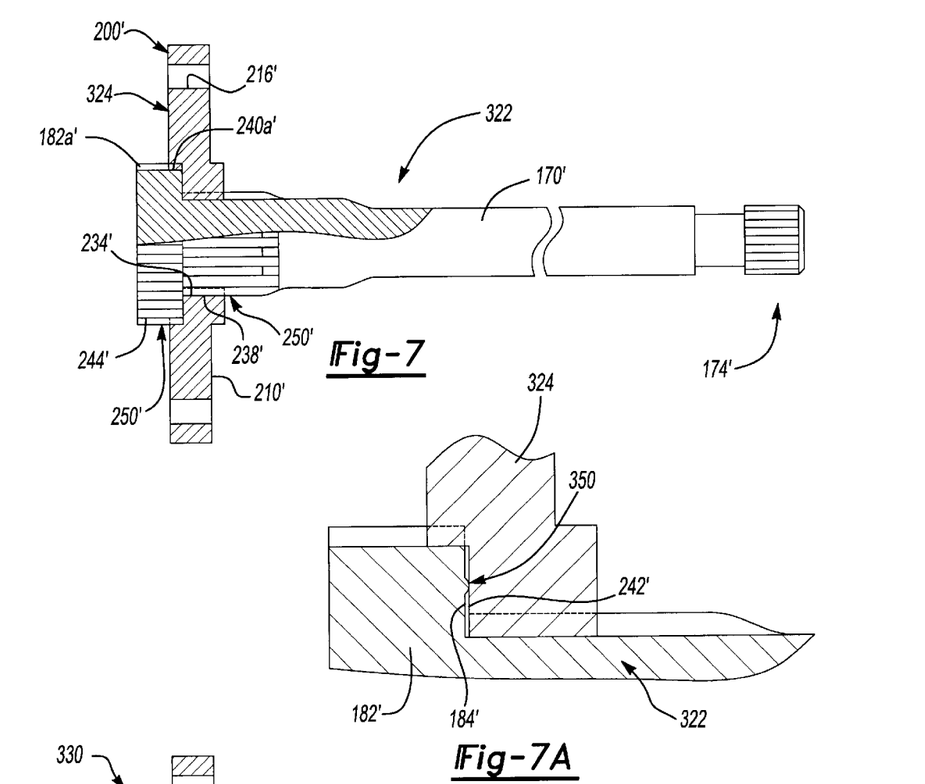
FIG. 7 is a partially broken-out side view of a portion of the axle shaft assembly of FIG. 6 illustrating the axle shaft in greater detail.
FIG. 7A is an enlarged sectional view of a portion of an axle shaft assembly similar to that of FIG. 7 but illustrating the use of projection welds to couple the flange and shaft structures.

While the axle shafts of the present invention have been described thus far with reference to a semi-floating axle assembly, those skilled in the art will appreciate that the present invention, in its broader aspects, may be constructed somewhat differently. For example, the axle shafts of the present invention may be similarly incorporated into a full-floating axle as illustrated in FIGS. 6 and 7. As illustrated, an axle shaft assembly 300 is shown in association with an axle assembly 302 and a wheel 304. The axle assembly 302 includes a housing 306 with a pair of outwardly extending hollow hubs 308 (only one of which is shown). The housing 306 is otherwise similar to housing 40 discussed above. A pair of bearings 310 are disposed between each hub 308 and an associated wheel 304 and operatively support the wheel 304 for rotation on the hub 308. Each of the axle shaft assemblies 300 includes an axle shaft 320 having a shaft structure 322 and a flange structure 324. The shaft structure 322 is shown to extend through the hollow cavity 326 in the hub 308 and is coupled to a differential unit (not shown) that is similar in its construction and operation to the differential unit 42 described above. The flange structure 324 is coupled to the wheel 304 and cooperates with the shaft structure 322 to transmit drive torque from the differential to the wheel. As those skilled in the art will appreciate, the axle shaft assembly 300 is illustrated to be of a full-floating design, wherein the axle shaft 320 drives the wheel 304 but does not hold the wheel 304 or carry the weight of the vehicle.

Figure 8:
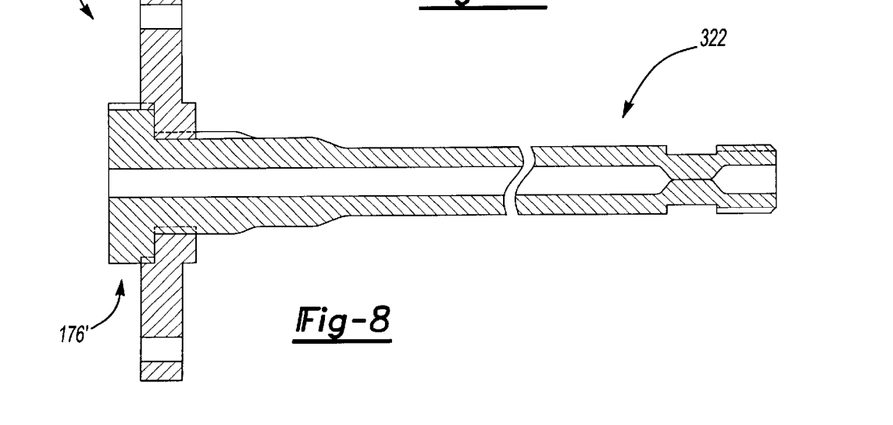
FIG. 8 is a view similar to that of FIG. 7, but illustrating the axle shaft as being formed from a tubular blank.

Generally, the axle shaft 320 is similar to the axle shaft 152, being simplified somewhat in view of the fact that a bearing surface need not be formed on the shaft structure 322. Accordingly, the shaft structure 322 includes a body portion 170', an input portion 174', and a coupling portion 176', which are substantially similar in their construction to the body portion 170, input portion 174 and coupling portion 176, respectively, of the axle shaft 152 described above. As such, the shaft structure 322 will not be discussed in detail other than to note that the coupling portion 176' includes an engagement surface 186' and a secondary engagement surface 244', both of which are preferably non-circular in shape. In the particular embodiment illustrated, the engagement surface 186' includes a plurality of circumferentially spaced spline teeth 188' and the secondary engagement surface 244' includes a plurality of lobes 182a', both of which will be discussed in greater detail, below. Those skilled in the art will understand from the description below, however, that any appropriate geometric shape may be substituted for the spline teeth 188' and the lobes 182a' or that these interfaces may be cylindrical. Those skilled in the art will also readily understand that the axle shaft 320 may be formed from a solid billet as shown in FIG. 7, or may be formed from a hollow tube 330, as shown in FIG. 8.

Referring back to FIGS. 6 and 7, the flange structure 324 is illustrated to be similar to the flange structure 162, in that it is also a one-piece annular plate which is preferably formed in a fine blanking operation. The flange structure 324 includes a wheel mounting portion 200' and a center hub 202'. The wheel mounting portion 200' includes a generally flat abutting face 210', which is configured to abut an associated one of the wheels 304, and a plurality of cylindrically shaped, circumferentially spaced wheel stud receiving apertures 216' that extend through the wheel mounting portion 200' on an axis that is perpendicular to the abutting face 210' and which are sized to receive the threaded portion 334 of a conventional wheel stud 336. A nut 338 is threadably engaged to the threaded portion 334 and generates a clamping force that fixes the flange structure 324 to the wheel 304.

The center hub 202' includes a mounting aperture 230' that is arranged perpendicular to the abutting face 210' and which includes a contact surface 234', as well as a secondary mounting aperture 240' having a secondary contact surface 242'. The contact surface 234' is configured to engage the engagement surface 186' of the coupling portion 176' in a manner that facilitates the transmission of rotary power therebetween. In the example provided, a plurality of spline apertures 238' are formed into the perimeter of the mounting aperture 230'. Also in the example provided, the secondary contact surface 242' includes a plurality of lobes 240a' that are configured to matingly engage lobes 182a' formed into the secondary engagement surface 244'. As with the previously described embodiment, the mounting aperture 230' and the secondary mounting aperture 240' are preferably sized such that the engagement surface 186' and the contact surface 234', as well as the secondary engagement surface 244' and the secondary contact surface 242', are fixedly coupled with an interference fit. One or more laser welds 250' may additionally or alternatively be employed to fix the shaft structure 322 and the flange structure 324 to one another. With reference to FIG. 7A, a plurality of projections 350 are alternatively formed onto one of the abutting flange 184' and the secondary contact surface 242'. The projections 350 facilitate a projection welding operation that fixedly couples the head portion 182' to the flange structure 324.

With the shaft structure 322 and the flange structure 324 formed in the manner described above, they are thereafter assembled such that the coupling portion 176' is engaged to the mounting aperture 230'. The shaft structure 322 and the flange structure 324 are thereafter laser welded so as to ensure that they remain fixedly coupled to one another. As discussed above, however, the engagement surface 186' and the contact surface 234' are preferably configured to transmit rotary power between the shaft structure 322 and the flange structure 324. Accordingly, the laser weld 250' need not serve as a significant means for transferring rotary power between the shaft structure 322 and the flange structure 324.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for forming an axle shaft, comprising:
   forming a flange structure, the flange structure including a mounting aperture and a contact surface that are formed through fine blanking;
   providing a shaft structure having a coupling portion with an engagement surface; and
   coupling the shaft structure and the flange structure such that the engagement surface is engaged to the contact surface to transmit rotary power therebetween.

2. The method of claim 1, wherein the shaft structure is formed from a first material and the flange structure is formed from a second material that is different from the first material.

3. The method of claim 1, wherein the shaft structure is formed from a generally tubular material.

4. The method of claim 3, wherein the tubular material is welded tubing.

5. The method of claim 3, wherein at least a portion of the shaft structure is formed in a rotary swaging operation.

6. The method of claim 1, wherein the engagement surface has a non-circular shape that is configured to matingly engage the contact surface.

7. The method of claim 6, wherein one of the engagement and contact surfaces includes a plurality of spline teeth for engaging a plurality of spline apertures formed in the other one of the engagement and contact surfaces.

8. The method of claim 7, wherein the plurality of spline teeth are formed onto the shaft structure in a roll forming operation.

9. The method of claim 1, wherein the shaft structure and the flange structure are coupled by a coupling means that includes at least one laser weld.

10. The method of claim 1, wherein the shaft structure and the flange structure are coupled by a coupling means that includes at least one projection weld for fixedly coupling the shaft structure and the flange structure.

11. The method of claim 1, wherein the shaft structure and the flange structure are coupled by a coupling means that includes an interference fit between the engagement surface and the contact surface.

12. The method of claim 1, wherein the shaft structure includes an input spline that is adapted to matingly engage a spline aperture formed in a side gear of the differential assembly.

13. The method of claim 1, wherein the coupling portion further includes a head portion that is at least partially disposed within a secondary mounting aperture formed into the flange structure.

14. The method of claim 13, wherein a portion of the head portion has a diameter that is larger than a diameter of the mounting aperture.

15. The method of claim 13, wherein the shaft structure and the flange structure are coupled by a coupling means that includes at least one laser weld for fixedly coupling the head portion to the flange structure.

16. The method of claim 13, wherein the shaft structure and the flange structure are coupled by a coupling means that includes at least on projection weld for fixedly coupling the head portion and the flange structure.

17. The method of claim 13, wherein the shaft structure and the flange structure are coupled by a coupling means that includes an interference fit between the head portion and the secondary mounting aperture.

18. The method of claim 13, wherein the head portion includes a secondary engagement surface and the secondary mounting aperture has a secondary contact surface, the secondary engagement surface having a non-circular shape that is configured to matingly engage the secondary contact surface.

19. The method of claim 18, wherein one of the secondary engagement and secondary contact surfaces includes a plurality of spline teeth for engaging a plurality of spline apertures formed in the other one of the secondary engagement and secondary contact surfaces.

20. The method of claim 19, wherein the plurality of spline teeth are formed onto the head portion in a roll forming operation.

21. The method of claim 1, wherein the flange structure is formed from a sheet material that has been processed in a rolling operation.

22. The method of claim 1, wherein the shaft structure further comprises a bearing surface that is adapted to engage in a press-fit manner a race of a bearing.

23. A method for forming an axle shaft, comprising:
providing a shaft structure having a coupling portion that defines an engagement surface and a head portion with an abutting flange;
forming a flange structure in a fine blanking operation such that the flange structure includes an elongated center hub, a mounting aperture and a secondary mounting aperture, the mounting aperture extending through the center hub, the secondary mounting aperture terminating at an abutting face on a first side of the center hub, the mounting aperture defining a contact surface; and
coupling the flange structure and the shaft structure such that the shaft structure is partially received through the mounting aperture so that the contact surface engages the engagement surface and the head portion is at least partially received into the secondary mounting aperture such that the abutting flange confronts the abutting face.

24. The method of claim 23, wherein the flange structure is formed from a flat stock or sheet material.

25. The method of claim 24, wherein the flat stock or sheet material has been rolled to elongate its grain structure in a predetermined direction.

26. The method of claim 23, wherein the shaft structure is formed from a first material and the flange structure is formed from a second material that is different from the first material.

27. The method of claim 23, wherein the shaft structure is formed from a generally tubular material.

28. The method of claim 27, wherein the tubular material is welded tubing.

29. The method of claim 27, wherein at least a portion of the shaft structure is formed in a rotary swaging operation.

30. The method of claim 23, wherein the engagement surface has a non-circular shape that is configured to matingly engage the contact surface.

31. The method of claim 30, wherein one of the engagement and contact surfaces includes a plurality of spline teeth for engaging a plurality of spline apertures formed in the other one of the engagement and contact surfaces.

32. The method of claim 31, wherein the plurality of spline teeth are formed onto the shaft structure in a roll forming operation.

33. The method of claim 23, wherein the shaft structure and the flange structure are coupled by a coupling means that includes at least one laser weld.

34. The method of claim 23, wherein the shaft structure and the flange structure are coupled by a coupling means that includes at least one projection weld for fixedly coupling the shaft structure and the flange structure.

35. The method of claim 23, wherein the shaft structure and the flange structure are coupled by a coupling means that includes an interference fit between the engagement surface and the contact surface.

36. The method of claim 23, wherein the shaft structure includes an input spline that is adapted to matingly engage a spline aperture formed in a side gear of the differential assembly.

37. The method of claim 23, wherein the shaft structure and the flange structure are coupled by a coupling means that includes at least one laser weld for fixedly coupling the head portion to the flange structure.

38. The method of claim 23, wherein the shaft structure and the flange structure are coupled by a coupling means that includes at least on projection weld for fixedly coupling the head portion and the flange structure.

39. The method of claim 23, wherein the shaft structure and the flange structure are coupled by a coupling means that includes an interference fit between the head portion and the secondary mounting aperture.

40. The method of claim 23, wherein the shaft includes a secondary contact surface and the secondary mounting aperture defines a secondary engagement surface which engages the secondary contact surface, wherein the secondary contact surface is defined by a first periodic wave, wherein the secondary engagement surface is defined by a second periodic wave similar to the first periodic wave.

41. The method of claim 40, wherein the first periodic wave is formed in a roll forming operation.

42. The method of claim 23, wherein the shaft structure further comprises a bearing surface that is adapted to engage in a press-fit manner a race of a bearing.

* * * * *